United States Patent
Kumar

(10) Patent No.: US 9,548,916 B1
(45) Date of Patent: Jan. 17, 2017

(54) PERFORMING DISCOVERY OF A VIRTUAL ENVIRONMENT

(75) Inventor: Sunil Kumar, Karnataka (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 794 days.

(21) Appl. No.: 13/535,808

(22) Filed: Jun. 28, 2012

(51) Int. Cl.
*H04L 12/751* (2013.01)
*G06F 9/50* (2006.01)

(52) U.S. Cl.
CPC ............ *H04L 45/02* (2013.01); *G06F 9/5077* (2013.01)

(58) Field of Classification Search
None
See application file for complete search history.

(56) References Cited

U.S. PATENT DOCUMENTS

| | | | | |
|---|---|---|---|---|
| 5,999,179 | A * | 12/1999 | Kekic et al. | 715/734 |
| 8,181,011 | B1 * | 5/2012 | Chang | 713/152 |
| 8,312,231 | B1 * | 11/2012 | Li et al. | 711/154 |
| 8,321,643 | B1 * | 11/2012 | Vaghani et al. | 711/162 |
| 2003/0050974 | A1 * | 3/2003 | Mani-Meitav et al. | 709/203 |
| 2004/0025001 | A1 * | 2/2004 | Stevens et al. | 713/2 |
| 2011/0047466 | A1 * | 2/2011 | Michelman | 715/734 |
| 2011/0099325 | A1 * | 4/2011 | Roh | G06F 3/0619 711/103 |
| 2012/0151355 | A1 * | 6/2012 | Butt et al. | 715/736 |

OTHER PUBLICATIONS

Unknown Author, "Data Center"—wikipedia, en.wikipedia.org/wiki/Data_center, Feb. 8, 2012.*
Unknown Author, "Storage Area Network"—Wikipedia, en.wikipedia.org/wiki/Storage_area_network, 2014.*
Swapnil.Chikhaldekar, "Are LUNS and Datastore same", Sep. 6, 2013.*
Todd Bolton et al., EMC—Managing Data Center Connectivity, Feb. 2012.*

* cited by examiner

*Primary Examiner* — Lewis A Bullock, Jr.
*Assistant Examiner* — Kevin X Lu
(74) *Attorney, Agent, or Firm* — Daly, Crowley, Mofford & Durkee, LLP

(57) ABSTRACT

In one aspect, a method includes performing a fast discovery on a virtual network to obtain objects and attributes necessary to display the objects on a user interface, performing a full discovery on the virtual network after the fast discovery and performing rediscovery regularly on the virtual network after the full discovery comprising updating object data based on changes since the last discovery was performed.

13 Claims, 7 Drawing Sheets

PERFORMING DISCOVERY OF A VIRTUAL ENVIRONMENT

BACKGROUND

Over time virtual environments have been used increasingly in storage environment and the scale of their deployment has also increased. For example, a virtual environment may include hundreds to thousands of objects. These objects are added, removed or changed over time. It is important for a host connected to the virtual environment to account for these objects.

SUMMARY

In one aspect, a method includes performing a fast discovery on a virtual network to obtain objects and attributes necessary to display the objects on a user interface, performing a full discovery on the virtual network after the fast discovery and performing rediscovery regularly on the virtual network after the full discovery comprising updating object data based on changes since the last discovery was performed.

In another aspect, an article includes a non-transitory machine-readable medium that stores executable instructions. The instructions cause a machine to perform a fast discovery on a virtual network to obtain objects and attributes necessary to display the objects on a user interface, perform a full discovery on the virtual network after the fast discovery and perform rediscovery regularly on the virtual network after the full discovery comprising updating object data based on changes since the last discovery was performed.

In a further aspect, an apparatus includes circuitry configured to perform a fast discovery on a virtual network to obtain objects and attributes necessary to display the objects on a user interface, perform a full discovery on the virtual network after the fast discovery and perform rediscovery regularly on the virtual network after the full discovery comprising updating object data based on changes since the last discovery was performed.

DETAILED DESCRIPTION

Figure 1:
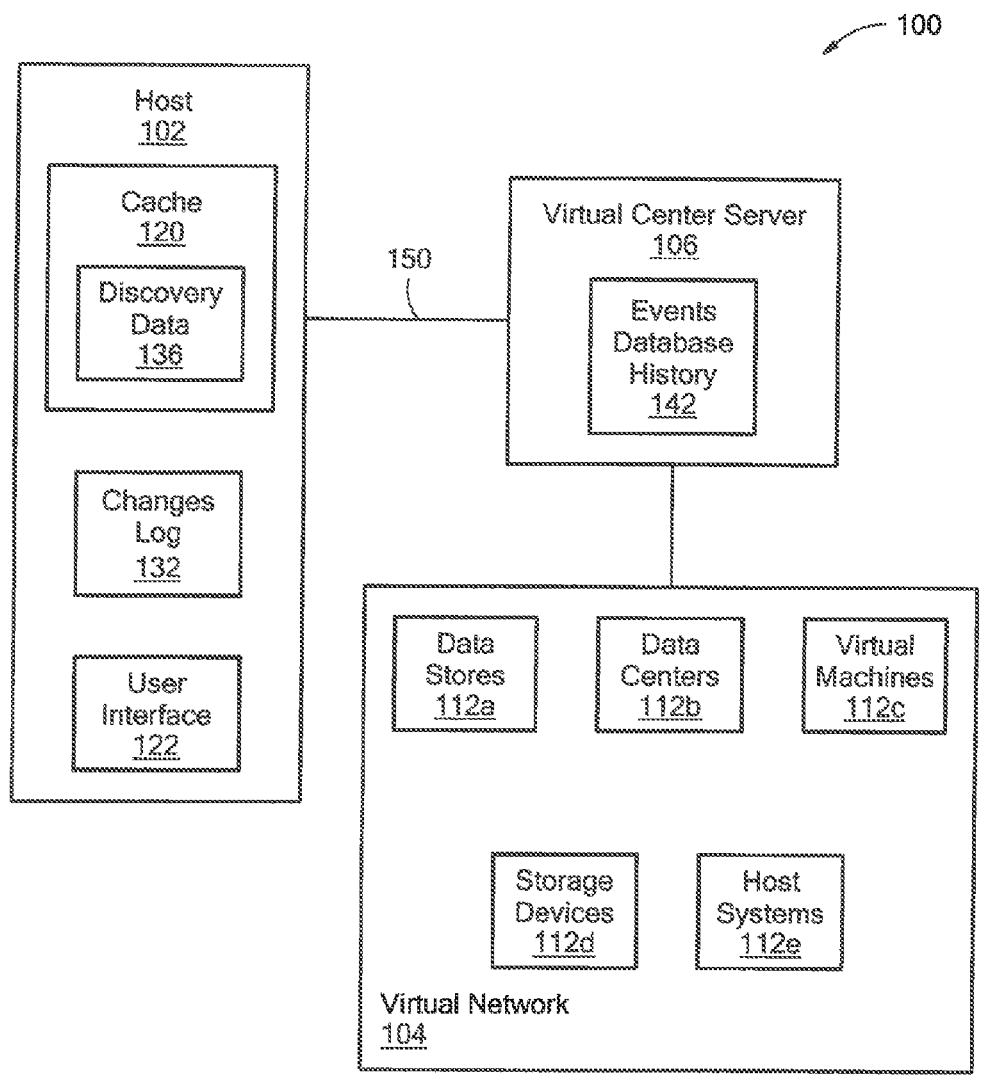
FIG. 1 is a block diagram of an example of a system that includes a virtual network.

One way for the host to keep track of objects in a virtualization environment is to perform discovery routinely. However, with hundreds or thousands of objects in the virtualized environment, discovery must be performed as efficiently as possible. Described herein is an approach to perform discovery of a virtualized environment, Referring to FIG. 1, a system 100 includes a host 102, a virtualized server 106 and a virtual network 104. The virtual network 104 includes objects such as data stores 112a, data centers 112b, virtual machines 112c, storage devices 112d and host systems 112e. The host 102 includes a cache 120 and a user interface 122. The host 102 performs discovery on the virtual center 106 through a connection 150 to determine the objects in the virtual network 104. The virtual center server includes an event database history that records event in the virtual network 104. The host 102 monitors changes in the virtual network 104 by communicating with the virtual center server 106 to get all the events from the events database history 142 and records the changes in a changes log 132.

The results of the discovery are stored in the cache 120. The cache 120 includes discovery data 136. In one example, some or parts of the discovery are initiated using the user interface 122.

Figure 2:
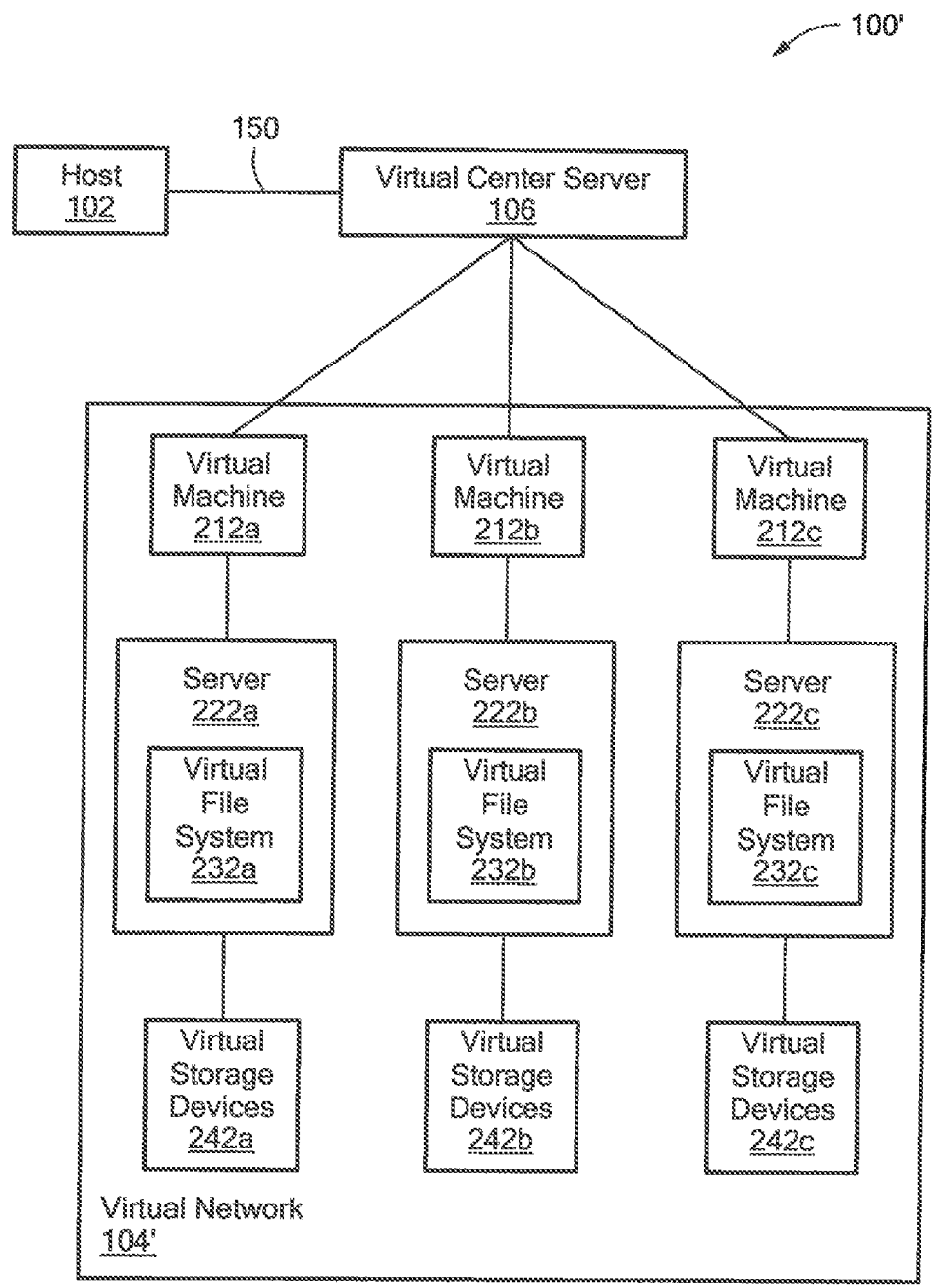
FIG. 2 is a block diagram of a particular example of the system of FIG. 1.

Referring to FIG. 2, one particular example of the system 100 is a system 100'. The system 100' includes the host 102, the virtual center server 106 and a virtual network 104'. The virtual network 104' includes virtual machines 212a-212c, each connected to a respective server 222a-222c. In one example, one or more of the servers 222a-222c is a VMWARE® ESX®.

In one example, each of the servers 222a-222c includes a respective virtual file system 232a-232c. In one example, one or more of the virtual file systems 232a-232c is a VMWARE® Virtual File Management System (VFMS).

Each server 222a-222b is coupled to a respective virtual storage device 242a-242c.

Figure 3:
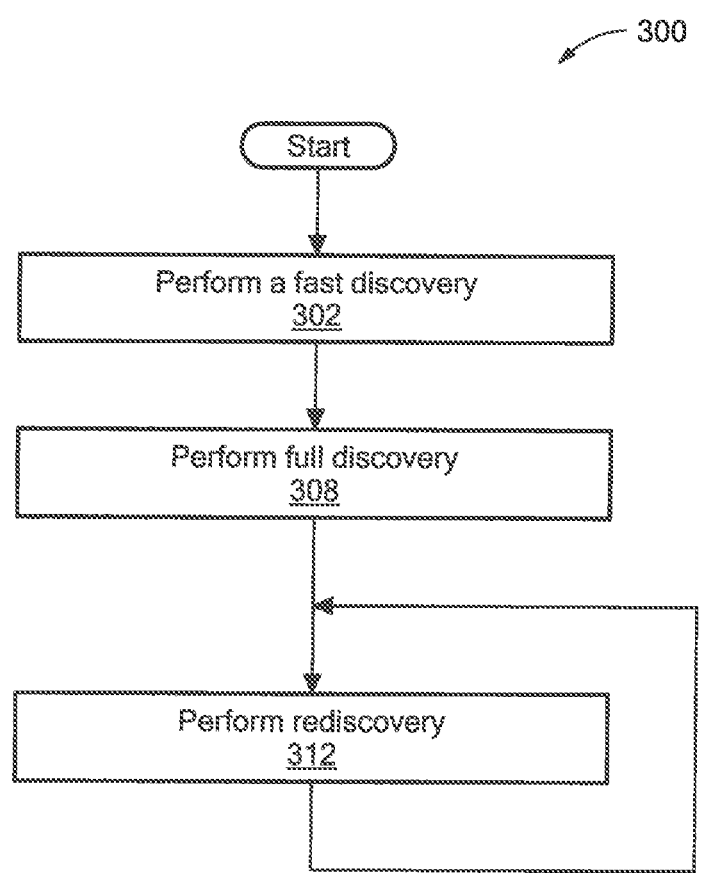
FIG. 3 is a flowchart of an example of a process to perform discovery.

Referring to FIG. 3, an example of a process to perform discovery of a virtual center server 106 by the host 102 is a process 300. Process 300 performs a fast discovery (302). For example, the host 102 obtains the objects in the virtual network 104 and a minimum set of attributes which are required for the objects to be displayed on the user interface 10.

Process 300 performs a full discovery (308). The host 102 retrieves all the objects in the virtual network 104 including their mappings to each other.

Process 300 performs rediscovery (312). For example, the rediscovery is performed on a regular basis. Since most of the data was supplied during processing blocks 302, 308 the rediscovery is focused on the changes since the last discovery.

Figure 4:
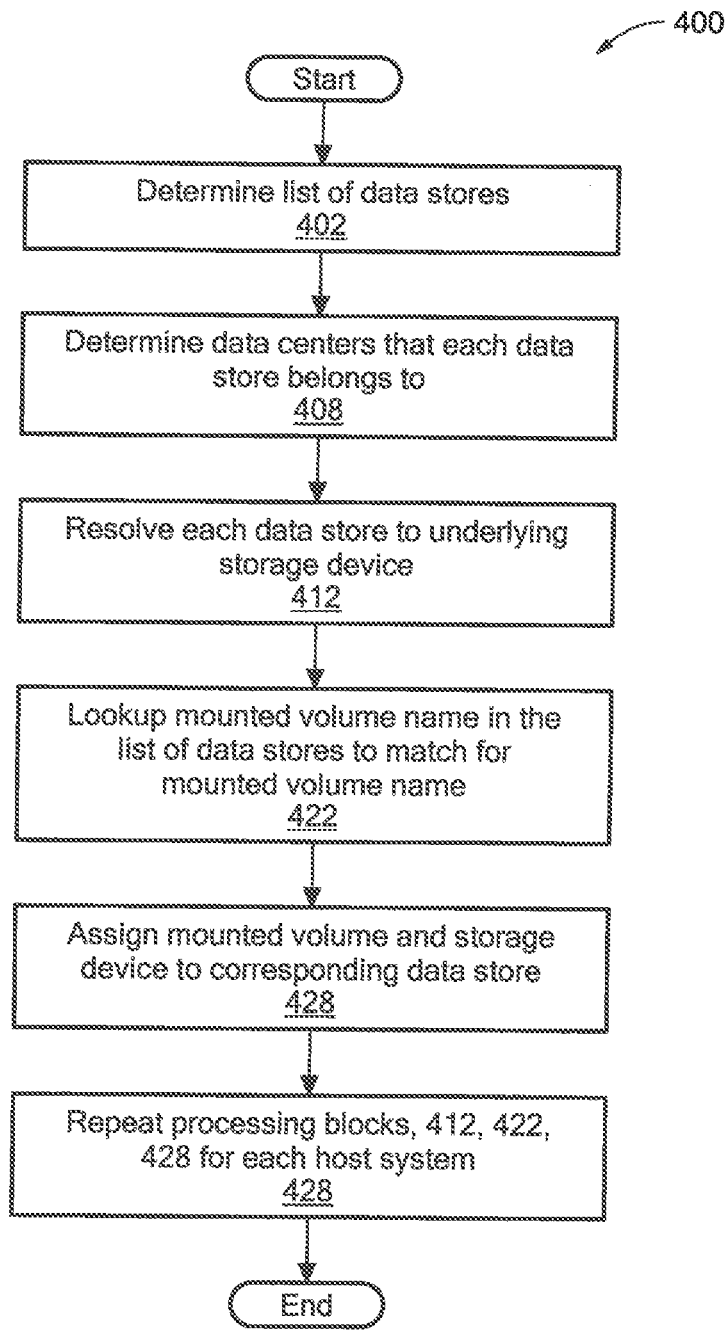
FIG. 4 is a flowchart of an example of a process to perform a full discovery.

Referring to FIG. 4, an example of a process to perform a full discovery (e.g., processing block 308 in FIG. 3) is a process 400. Process 400 determines a list of the data stores 112a (402) and determines the data centers 112b that each data store 112a belongs to (408).

Process 400 resolves each data store 112a to an underlying storage device 112d (412). For example, a host system 112e is found for each data store and the mounted volume information on the host system 112e is read and mounted volumes are resolved to the storage device 112d.

Once the storage device 112d for each mounted volume is known, process 400 looks up the mounted volume name in the list of data stores 112a (422).

Once a match is found for a mounted volume name in the list of data stores 112e, process 400 assigns the mounted volume and the storage device 112d to a corresponding data store 112a (428). After finding a match for each mounted volume on the first host system 112e, process 400 repeats processing blocks 412, 422, 428 for each host system (428).

Figure 5:
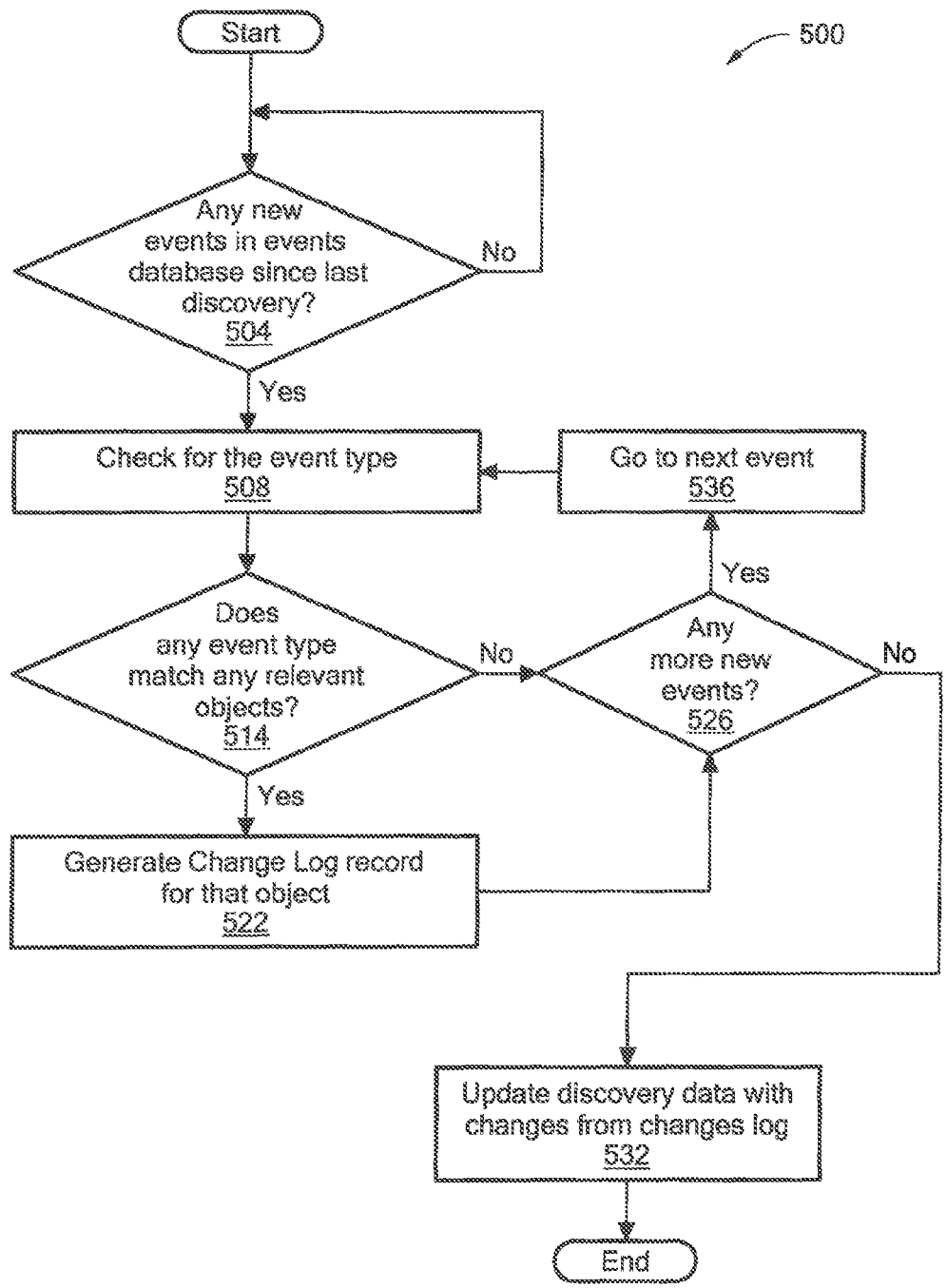
FIG. 5 is a flowchart of an example of a process to perform a rediscovery.

Referring to FIG. 5, an example of a process to perform rediscovery (e.g., processing block 312 in FIG. 3) is a process 500. Process 500 determines if there are any new events since the last discovery (504). For example, process 500 checks a time stamp of the last discovery in the cache 120 and determines if there have been any changes since the last time stamp.

Process 500 checks for the event type of each new event (508). Process 500 determines if any event type matches any relevant objects (i.e., objects whose discovery is of interest to, for example, a user) (514).

If any event type matches, process 500 generates a change logs record for that object in the changes log 132 (514). If the event type does not match, process 500 determines if there any new events (528), and if so, goes to the next event (536) and repeats processing block 508. If there are no more new events, process 500 updates the discovery data with the changes recorded in the changes log 132 (532)

Figure 6:
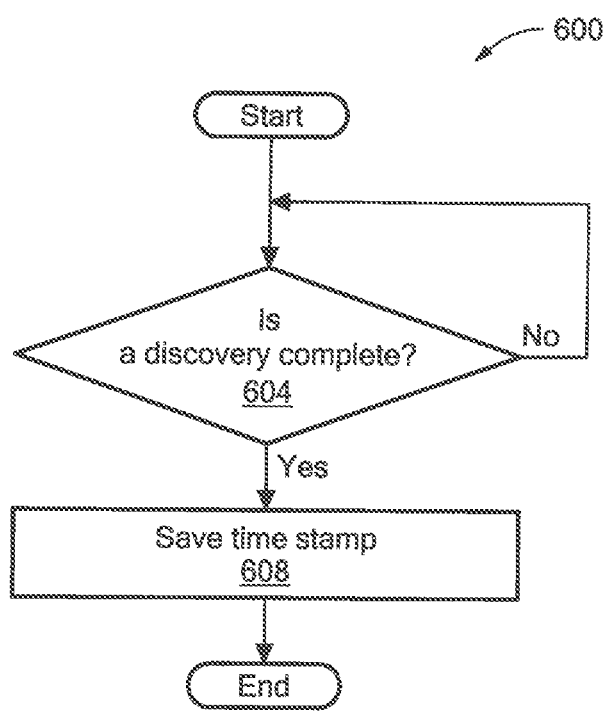
FIG. 6 is a flowchart of an example of a process to record discovery times.

Referring to FIG. 6, an example of a process to record discovery times is a process 600. Process 600 determines if a discovery has been performed (604). For example, process 600 determines if a fast, full or rediscovery has been performed. If a discovery has been performed, process 600 saves a time stamp at the cache 120 recording the time of the fast, full or rediscovery completion (608).

Figure 7:
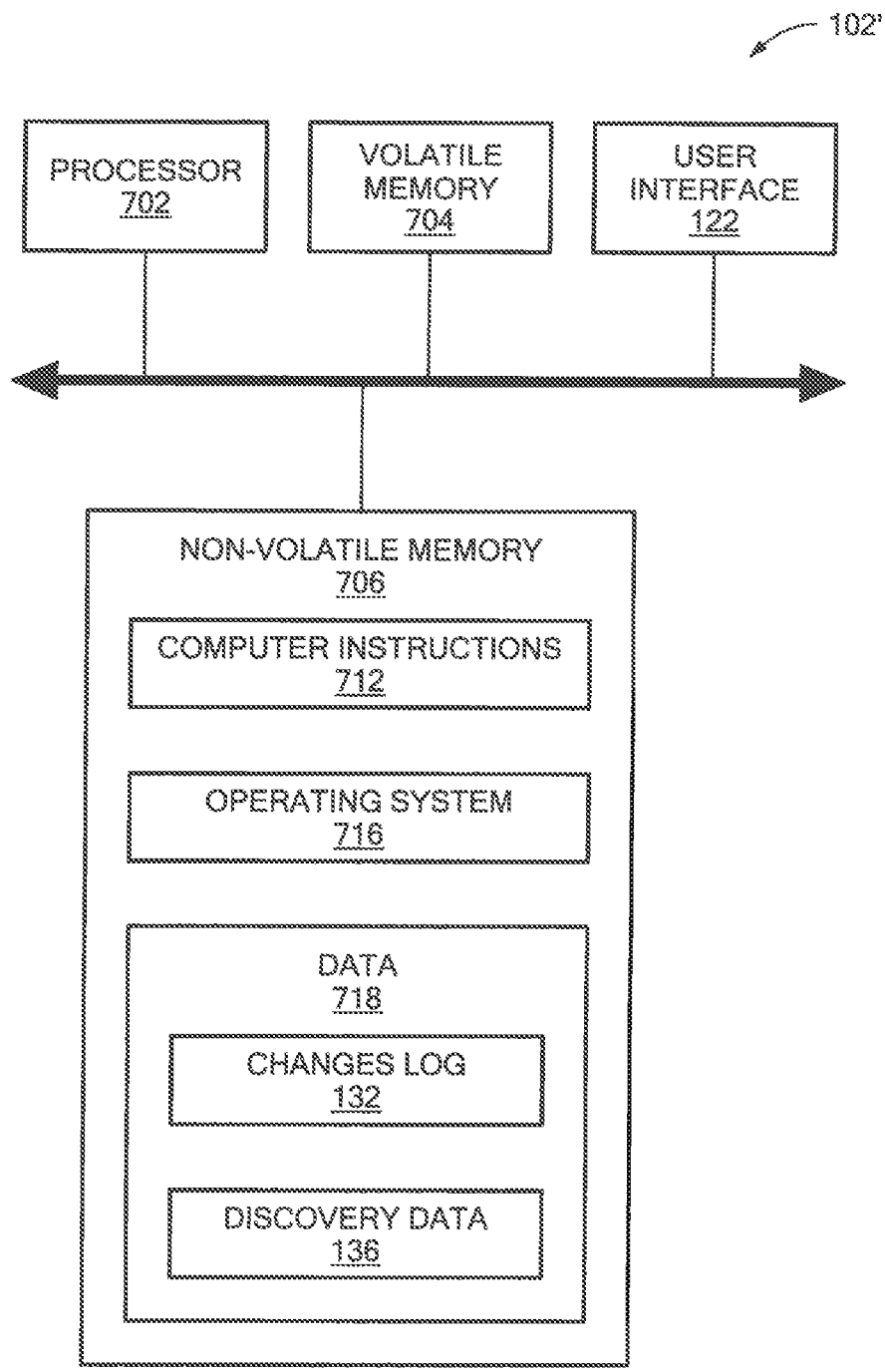
FIG. 7 is a computer on which the processes of FIGS. 3 to 6 may be implemented.

Referring to FIG. 7, in one example, a host 102 is a computer 102'. The computer 102' includes a processor 702, a volatile memory 704, a non-volatile memory 706 (e.g., hard disk) and the user interface (UI) 122 (e.g., a mouse, a keyboard, a display, touch screen and so forth). The non-volatile memory 706 stores computer instructions 712, an operating system 716 and data 718 including the changes log 132 and the discovery data 136. In one example, the computer instructions 712 are executed by the processor 702 out of volatile memory 704 to perform all or part of the processes described herein (e.g., processes 300 to 600).

The processes described herein (e.g., processes 300 to 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se. The processes described herein are not limited to the specific examples described.

For example, the processes 300 to 600 are not limited to the specific processing order of FIGS. 3 to 6, respectively. Rather, any of the processing blocks of FIGS. 3 to 6 may be re-ordered, combined or removed, performed in parallel or in serial, as necessary, to achieve the results set forth above.

The processing blocks (for example, in the processes 300 to 600) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method comprising:
performing a fast discovery on a virtual network to obtain a subset of objects and only those attributes required to display the subset of objects on a user interface, the objects comprising data stores, data centers, virtual machines, storage devices and hosts;
displaying the subset of objects on the user interface;
performing a full discovery on the virtual network by retrieving all the objects in the virtual network and their mappings to each other, after the fast discovery and after displaying the subset of objects on the user interface, the full discovery comprises:
  determining a list of the data stores in the virtual network;
  determining the data centers that each of the data stores belongs after determining the list of data stores;
  resolving each data store to an underlying storage device by finding a host for each data store, reading mounted volume information on the host and resolving each mounted volume to a respective storage device;
  looking up a name of mounted volume in the list of data stores after resolving each data store;
  assigning the mounted volume and the storage device to a corresponding data store after a match is found in the list of data stores; and
performing rediscovery regularly on the virtual network after the full discovery comprising:
  repeating the resolving of each data store, the looking up and the assigning; and
  updating object data based on changes since the last full discovery was performed.

2. The method of claim 1 wherein performing the rediscovery further comprises determining if there have been any changes in an event history database since a previous discovery.

3. The method of claim 2 wherein determining if there have been any changes in the event history database comprises:
   checking a time stamp of a last discovery; and
   determining if there have been any changes to the virtual network since the last time stamp.

4. The method of claim 3, further comprising:
   determining if a fast discovery, a full discovery or a rediscovery is complete; and
   recording a time of completion of the fast discovery, the full discovery or the rediscovery using the time stamp.

5. An article comprising:
   a non-transitory machine-readable medium that stores executable instructions, the instructions causing a machine to:
      perform a fast discovery on a virtual network to obtain a subset of objects and only those attributes required to display the subset of objects on a user interface, the objects comprising data stores, data centers, virtual machines, storage devices and hosts;
      display the subset of objects on the user interface;
      perform a full discovery on the virtual network by retrieving all the objects in the virtual network and their mappings to each other, after the fast discovery and after displaying the subset of objects on the user interface; and
      perform rediscovery regularly on the virtual network after the full discovery comprising updating object data based on changes since the last discovery was performed,
   wherein the instructions causing the machine to perform a full discovery on the virtual network after the fast discovery comprises instructions causing the machine to:
      determine a list of the data stores in the virtual network;
      determine the data centers that each of the data stores belongs after determining the list of data stores;
      resolve each data store to an underlying storage device by finding a host for each data store, reading mounted volume information on the host and resolving each mounted volume to a respective storage device;
      look up a name of mounted volume in the list of data stores after resolving each data store; and
      assign the mounted volume and the storage device to a corresponding data store after a match is found in the list of data stores,
   wherein performing rediscovery regularly on the virtual network comprises repeating the resolving of each data store, the looking up and the assigning.

6. The article of claim 5 wherein the instructions causing the machine to perform the rediscovery further comprises instructions causing the machine to determine if there have been any changes in a event history database since a previous discovery.

7. The article of claim 6 wherein the instructions causing the machine to determine if there have been any changes in the event history database comprises instructions causing the machine to:
   check a time stamp of a last discovery; and
   determine if there have been any changes to the virtual network since the last time stamp.

8. The article of claim 7, further comprising instructions causing the machine to:
   determine if a fast discovery, a full discovery or a rediscovery is complete; and
   record a time of completion of the fast discovery, the full discovery or the rediscovery using the time stamp.

9. An apparatus, comprising:
   circuitry configured to:
      perform a fast discovery on a virtual network to obtain a subset of objects and only those attributes required to display the subset of objects on a user interface, the objects comprising data stores, data centers, virtual machines, storage devices and hosts;
      display the subset of objects on the user interface;
      perform a full discovery on the virtual network by retrieving all the objects in the virtual network and their mappings to each other, after the fast discovery and after displaying the subset of objects on the user interface; and
      perform rediscovery regularly on the virtual network after the full discovery comprising updating object data based on changes since the last discovery was performed,
   wherein the instructions causing the machine to perform a full discovery on the virtual network after the fast discovery comprises instructions causing the machine to:
      determine a list of the data stores in the virtual network;
      determine the data centers that each of the data stores belongs after determining the list of data stores;
      resolve each data store to an underlying storage device by finding a host for each data store, reading mounted volume information on the host and resolving each mounted volume to a respective storage device;
      look up a name of mounted volume in the list of data stores after resolving each data store; and
      assign the mounted volume and the storage device to a corresponding data store after a match is found in the list of data stores,
   wherein performing rediscovery regularly on the virtual network comprises repeating the resolving of each data store, the looking up and the assigning.

10. The apparatus of claim 9 wherein the circuitry comprises at least one of a processor, a memory, programmable logic and logic gates.

11. The apparatus of claim 9 wherein the circuitry to perform the rediscovery further comprises circuitry to determine if there have been any changes in a event history database since a previous discovery.

12. The apparatus of claim 11 wherein the circuitry to determine if there have been any changes in the event history database comprises circuitry configured to:
   check a time stamp of a last discovery; and
   determine if there have been any changes to the virtual network since the last time stamp.

13. The apparatus of claim 12 wherein the circuitry is further configured to:
   determine if a fast discovery, a full discovery or a rediscovery is complete; and
   record a time of completion of the fast discovery, the full discovery or the rediscovery using the time stamp.

* * * * *